(12) United States Patent
Lin

(10) Patent No.: US 6,827,002 B1
(45) Date of Patent: Dec. 7, 2004

(54) AUTOMATIC COFFEE MAKER WITH GRINDING DEVICE

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 0 days.

(21) Appl. No.: 10/823,825

(22) Filed: Apr. 14, 2004

(51) Int. Cl.$^7$ .................. A47J 31/057; A47J 31/42; A47J 31/46; A47J 42/16; A47J 42/50

(52) U.S. Cl. .................. 99/286; 99/299; 99/305; 99/348; 99/510; 241/100; 241/101.1; 241/101.2; 241/259.1

(58) Field of Search .................. 99/348, 352–355, 99/495, 509–513, 286, 287, 288, 290, 289 R, 295–307; 241/33–37, 65, 81, 152.2, 100, 101.1, 101.2, 101.6, 261, 261.1, 261.2, 259.1, 245, 186.3, 79.1

(56) References Cited

U.S. PATENT DOCUMENTS

| | | | | |
|---|---|---|---|---|
| 1,189,035 A | * | 6/1916 | Asbury et al. | 241/100 |
| 3,107,600 A | * | 10/1963 | Robert | 99/286 |
| 3,327,615 A | * | 6/1967 | Swan | 99/286 |
| 4,007,675 A | * | 2/1977 | Cailliot et al. | 99/286 |
| 4,196,658 A | * | 4/1980 | Takagi et al. | 99/286 |
| 5,193,438 A | * | 3/1993 | Courtois | 99/286 |
| 5,465,650 A | * | 11/1995 | Friedrich et al. | 99/286 |
| 5,542,342 A | * | 8/1996 | McNeill et al. | 99/280 |
| 5,615,601 A | * | 4/1997 | Eugstar | 99/280 |
| 5,671,657 A | * | 9/1997 | Ford et al. | 99/286 |
| 5,865,095 A | * | 2/1999 | Mulle | 99/293 |
| 6,095,032 A | * | 8/2000 | Barnett et al. | 99/286 |
| 6,389,957 B1 | * | 5/2002 | Sham et al. | 99/286 |

* cited by examiner

Primary Examiner—Timothy F. Simone
(74) Attorney, Agent, or Firm—Alan D. Kamrath; Nikolai & Mersereau, P.A.

(57) ABSTRACT

An automatic coffee maker having a grinding device is provided. Responsive to closing a door, activating an electromagnetic valve will move a covering member away from first apertures and counterclockwise pivot a stop with resilient means being expanded so that powering on a motor will activate a gear mechanism to transmit motion to an outer grinding mechanism for grinding coffee beans into powder which drops through aligned second and first apertures onto a filter cup in a base prior to falling into a bowl in the base by permeation. The coffee maker further comprises a particle fineness adjusting device so that a turning of a projecting bar thereof will adjust the powder fineness.

3 Claims, 5 Drawing Sheets

AUTOMATIC COFFEE MAKER WITH GRINDING DEVICE

BACKGROUND OF THE INVENTION

1. Field of the Invention

The present invention relates to coffee makers and more particularly to an automatic coffee maker having a grinding device.

2. Description of Related Art

Coffee mills in the shape of mug are well known. Also, automatic drip coffee makers are well known. However, no document has disclosed a combination of both as far as the present inventor is aware. Moreover, fineness of coffee powder ground from beans in the prior mug-shaped coffee mill cannot be adjusted by a user. Thus, it is desirable to provide an automatic coffee maker having a grinding device with coffee particle fineness adjustment arrangement in order to overcome the above drawbacks of the prior art.

SUMMARY OF THE INVENTION

It is an object of the present invention to provide an automatic coffee maker having a grinding device and a particle fineness adjusting device.

To achieve the above and other objects, the present invention provides an automatic coffee maker, comprising a base comprising a motor, a reduction gear, a main gear meshed with the reduction gear, a top mounting plate including a plurality of equally spaced first apertures around a center thereof, a driven gear including a plurality of equally spaced second apertures around a central hole thereof wherein the number of the second apertures is the same as that of the first apertures, a top annular first flange around the second apertures, and two opposite risers on a top of the first flange, a threaded pin inserted through the driven gear into the mounting plate for fastening, an electromagnetic valve mounted on the base and including an arm and resilient means anchored between one end of the arm and the base, a covering member pivotably disposed at one end of the arm and including an internal hot water line, and a door including a stop on a top end of a hinged shaft thereof, the stop being in contact with the arm; an inner grinding mechanism comprising a spindle having a first lateral through hole, an internally threaded extension on a top of the spindle, and an externally threaded conic member in a lower portion, the conic member having a bottom recess with the threaded pin disposed therein; an outer grinding mechanism sleeved on the inner grinding mechanism and comprising a toothed section having an inverted, conic upper portion and a conic lower portion meshed with the conic member, and an upper annular second flange having two opposite flats engaged with the risers; hollow, cylindrical means comprising an annular top third flange and an annular bottom fourth flange having a diameter smaller than that of the third flange, the hollow, cylindrical means being tightly engaged with the flats and threadedly secured to the driven gear; a circular seat comprising an intermediate, annular fifth flange, a side opening with a joining portion of the main gear and the driven gear mounted therein, a tubelike central casing with the spindle received therein, the casing having a second lateral through hole, a second pin inserted through the second and first lateral through holes for fastening the seat and the inner grinding mechanism together, an externally threaded extension on a top of the casing, and an annular groove on an underside with the third flange snugly fitted therein, the seat being threadably secured to the mounting plate; a funnel-shaped container for containing coffee beans and comprising a tapering member rested on the fifth flange, an upper annular surface, and an indent on a top edge of the annular surface; and a fineness adjusting mechanism comprising an inverted cup having inner threads secured to the externally threaded extension, a fastener driven a top of the inverted cup into the internally threaded extension for fastening the fineness adjusting mechanism and the inner grinding mechanism together, and a transverse bar extended from the inverted cup through the indent; whereby responsive to placing a filter cup in the base and closing the door, activating the electromagnetic valve will move the covering member away from the first apertures and counterclockwise pivot the stop with the resilient means being expanded so that powering on the motor will activate the reduction gear and the main gear to transmit motion to the outer grinding mechanism via the risers for grinding the coffee beans into powder which drops through the aligned second and first apertures onto the filter cup prior to falling into a bowl in the base by permeation; deactivating the electromagnetic valve will compress the resilient means to pivot the covering member back to cover the second and first apertures, and cause hot water to flow from the hot water line into the filter cup for diluting the coffee powder; turning the bar in one direction will lower the conic member to lift the conic lower portion of the toothed section for increasing a space confined by the inner and outer grinding mechanisms, thereby making the coffee powder more coarse; and turning the bar in an opposite direction will lift the conic member to lower the conic lower portion of the toothed section for decreasing the space, thereby making the coffee powder finer.

In one aspect of the present invention the resilient means is a tension spring.

In another aspect of the present invention the seat further comprises a plurality of equally spaced apart ribs interconnected the casing and an edge thereof.

The above and other objects, features and advantages of the present invention will become apparent from the following detailed description taken with the accompanying drawings.

DETAILED DESCRIPTION OF THE PREFERRED EMBODIMENTS

Figure 1:
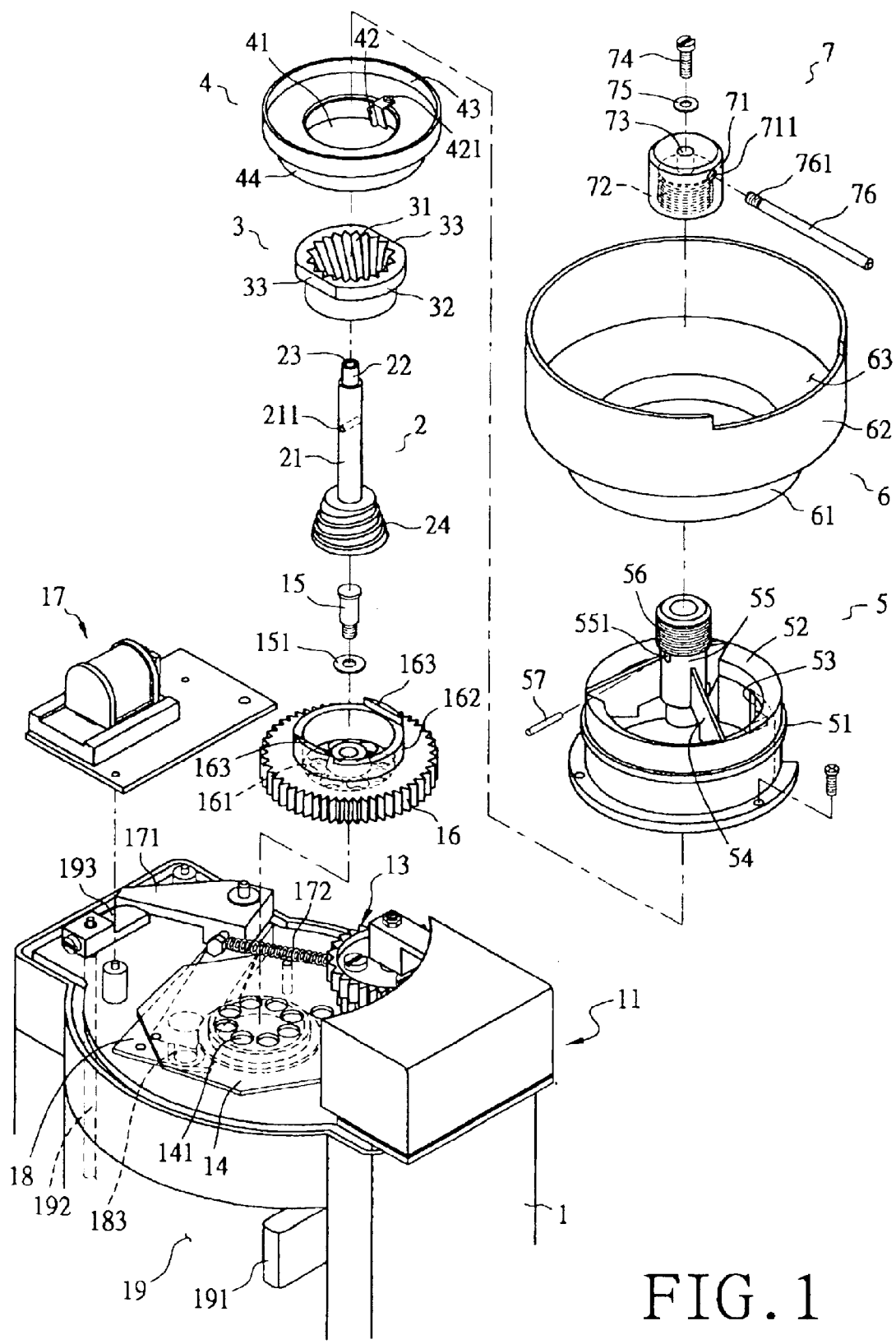
FIG. 1 is an exploded view of a preferred embodiment of automatic coffee maker according to the invention.
Figure 2:
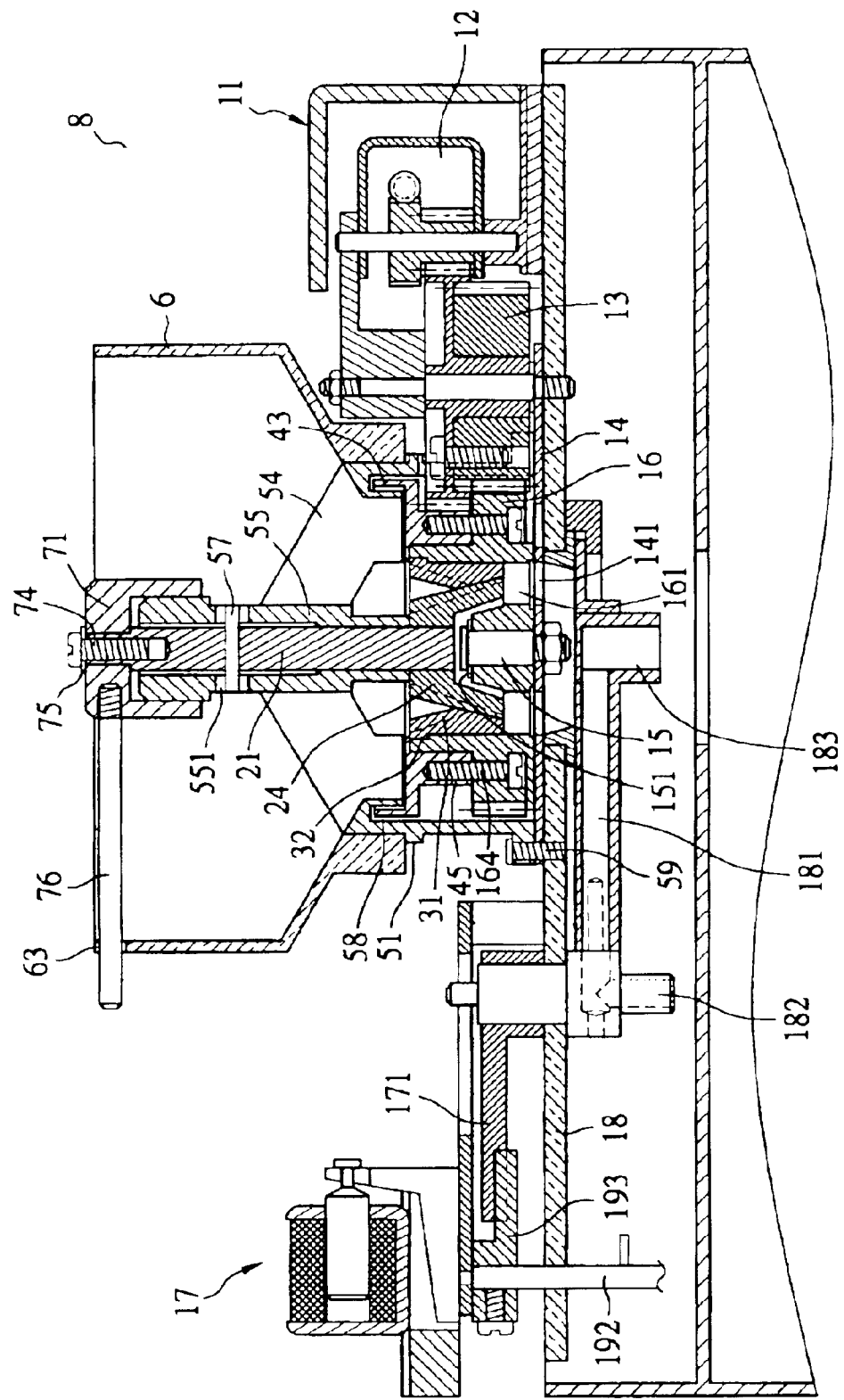
FIG. 2 is a cross-sectional view of the assembled coffee maker.

Referring to FIGS. 1 to 4, there is shown an automatic coffee maker constructed in accordance with the invention. The coffee maker comprises a base 1, an inner grinding mechanism 2, an outer grinding mechanism 3, a drum 4, a seat 5, a container 6, and a particle fineness adjusting mechanism 7. Each component will be described in detail below.

The base 1 comprises a top motor unit 11 for driving a reduction gear 12, a main gear 13 driven by the reduction gear 12 to transmit motion to a mounting plate 14 on the top, the mounting plate 14 including a plurality of equally spaced apertures 141 around a center thereof, a driven gear 16 including a plurality of equally spaced apertures 161 around a central hole wherein the number of the apertures 161 is the same as that of the apertures 141, a top annular flange 162 around the apertures 161, and two opposite risers 163 on a top of the flange 162, a threaded pin 15 inserted through a washer 151 and the central hole of the driven gear 16 into the mounting plate 14 for fastening, an electromagnetic valve 17 opposite the motor unit 11, the electromagnetic valve 17 mounted on top of the base 1 and including an arm 171 and a resilient member (e.g., tension spring) 172 anchored between one end of the arm 171 and the top of the base 1, a covering member 18 pivotably disposed at one end of the arm 171 and including an internal hot water line 181, a water inlet 182, and a water outlet 183, and a door 19 including a projecting handle 191, a shaft 192, and a stop 193 on a top end of the shaft 192, the stop 193 being in contact with the arm 171.

The inner grinding mechanism 2 comprises an upright spindle 21 having a lateral through hole 211, a projection 22 on a top of the spindle 21, the projection 22 having a reduced diameter and an internally threaded hole 23, and an externally threaded conic member 24 in the lower portion. The conic member 24 has a bottom recess with the pin 15 disposed therein.

The outer grinding mechanism 3 comprises a toothed section 31 having an inverted, conic upper portion and a conic lower portion, an upper annular flange 32, and two opposite flats 33 on the flange 32. The conic lower portion of the toothed section 31 is meshed with the conic member 24 and the flats 33 are engaged with the flat sides of the risers 163 when the outer grinding mechanism 3 is put on the inner grinding mechanism 2 (i.e., meshed with the conic member 24) for positioning.

The drum 4 comprises a central opening 41, an abutment member 42 on an edge of the opening 41, the abutment member 42 fastened by a fastener 421 to be snugly engaged with the flat 33, an annular first flange 43 on a top, and an annular second flange 44 on a bottom, the second flange 44 having a diameter smaller than that of the first flange 43, and a plurality of threaded holes 45 on a bottom of the second flange 44 so that a plurality of fasteners (e.g., screws) 164 are adapted to drive through the driven gear 16 into the holes 45 for fastening the driven gear 16 and the drum 4 together.

The circular seat 5 comprises an intermediate, annular flange 51, a top inclined, annular surface 52, a side opening 53 for permitting the main gear 13 and the driven gear 16 to mount on the base 1, a plurality of equally spaced apart ribs 54 interconnected a central boss 55 and the annular edge wherein the spindle 21 is received in the boss 55 and the boss 55 has a lateral through hole 551 so that a pin 57 can be inserted through the holes 551 and 211 for fastening the seat 5 and the inner grinding mechanism 2 together, an externally threaded extension 56 on top of the boss 55, and an annular groove 58 on an underside with the first flange 43 snugly fitted therein. The seat 5 is threadably secured to the mounting plate 14 by fasteners (e.g., screws) 59.

The funnel-shaped container 6 comprises a tapering member 61 rested on the flange 51 for enclosing the upper part of the seat 5, an upper annular surface 62, and an indent 63 on a top edge of the annular surface 62. The particle fineness adjusting mechanism 7 comprises an inverted cup 71 having a lateral threaded hole 711 and inner threads 72 threadably secured to the externally threaded extension 56, a top center hole 73 in communication with inside of the inverted cup 71, a fastener (e.g., screw) 74 driven through a washer 75 and the hole 73 into the internally threaded hole 23 for fastening the particle fineness adjusting mechanism 7 and the inner grinding mechanism 2 together, and a bar 76 having an externally threaded extension 761 threadably secured to the hole 711. The bar 76 is extended through the indent 63 and is permitted to rotate a limited angle defined by both ends of the indent 63.

Figure 3:
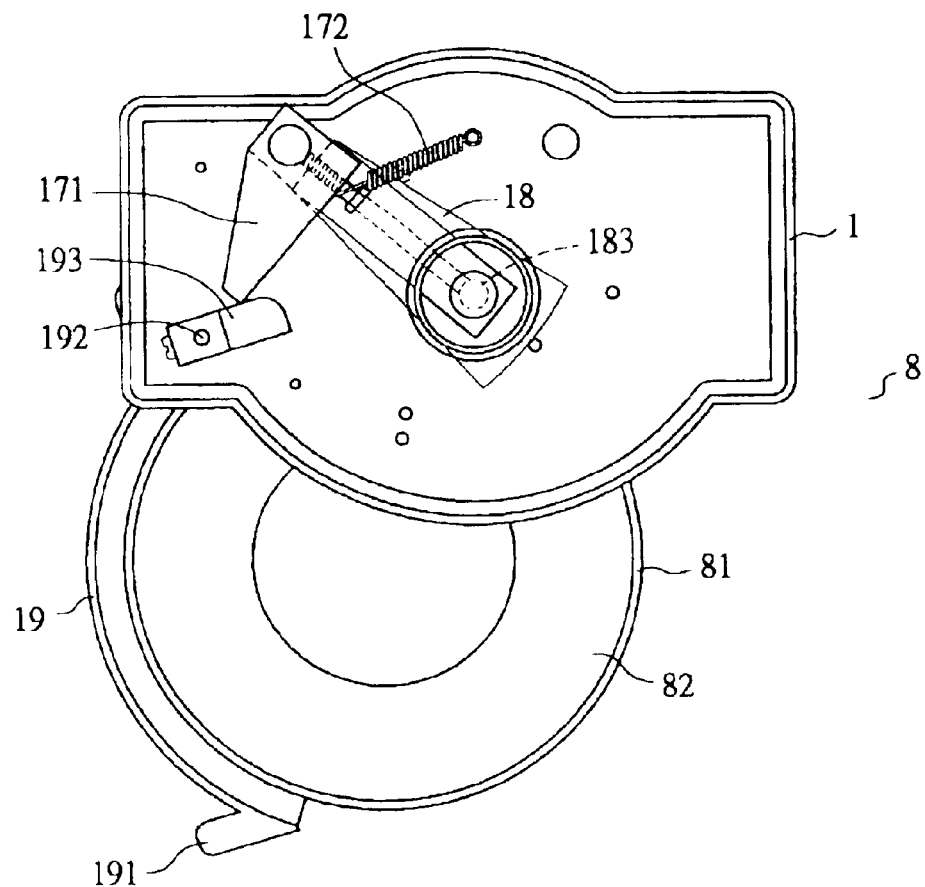
FIG. 3 is a top plan view of the assembled coffee maker with the door being open.
Figure 4:
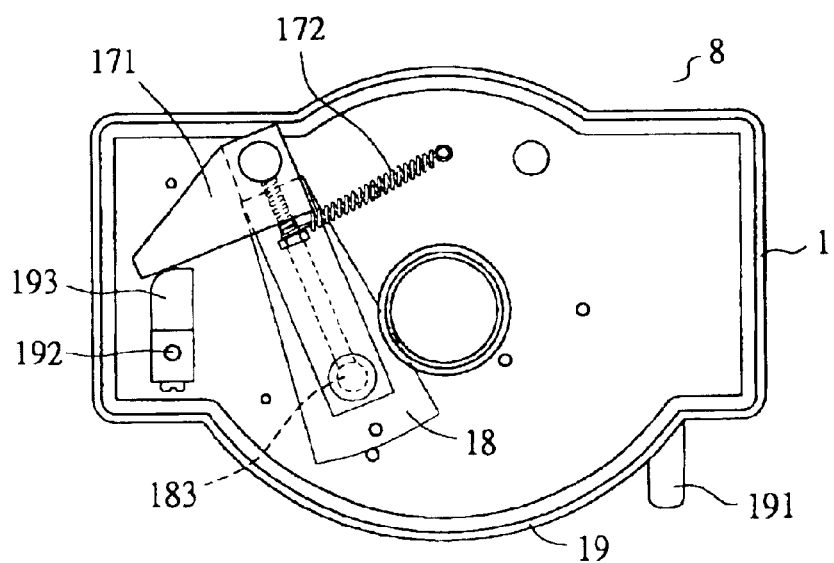
FIG. 4 is a view similar to FIG. 3 with the door being closed.
Figure 5:
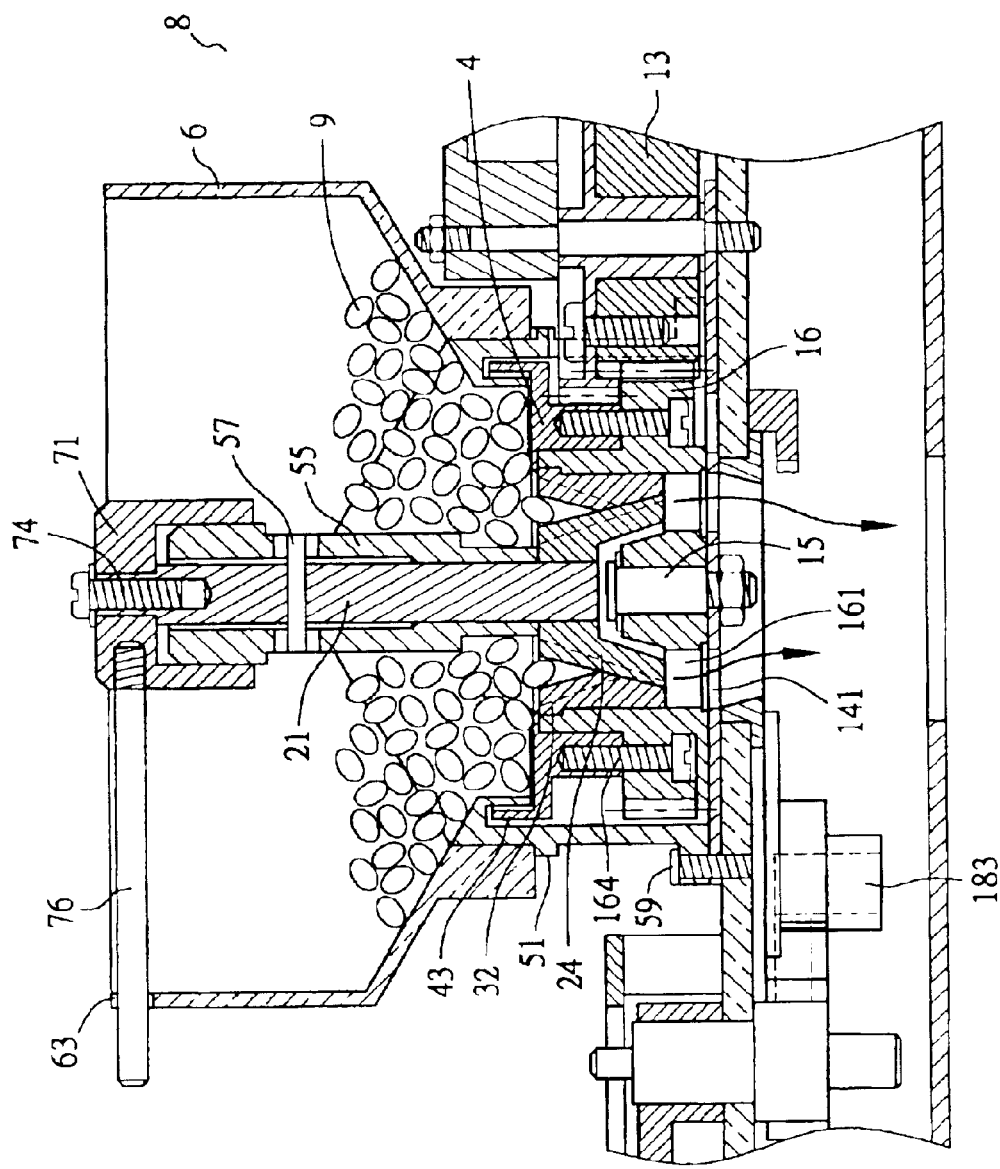
FIG. 5 is a view similar to FIG. 2 with coffee beans in the container being ground in the grinding process.
Figure 6:
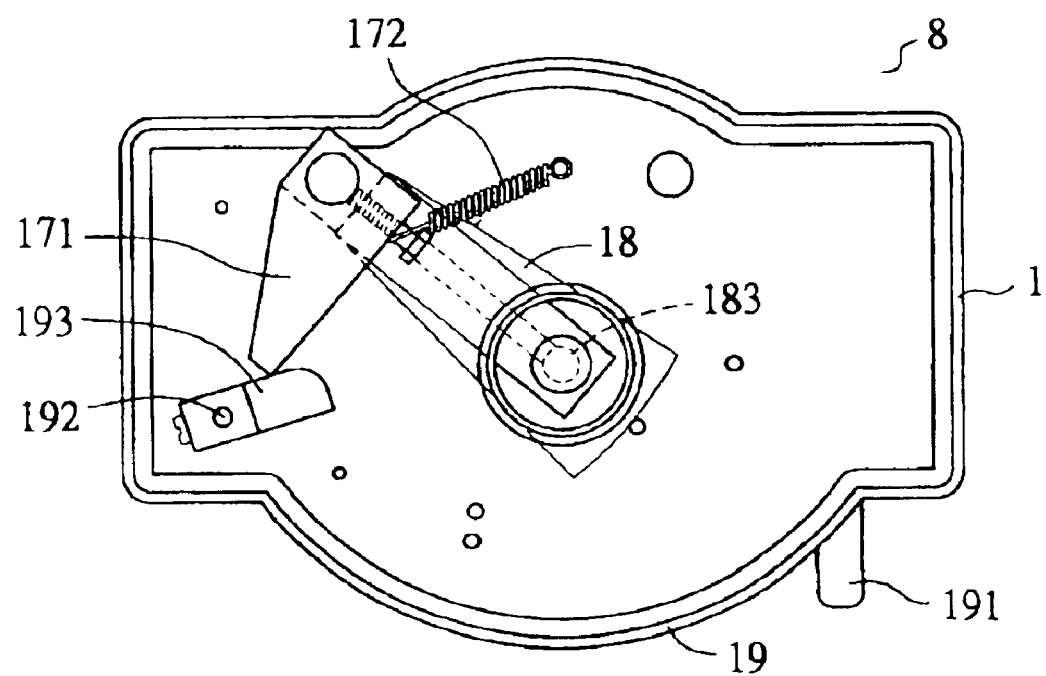
FIG. 6 is a view similar to FIG. 3 with the covering member being actuated to move to a place above the powder outlets for closing after finishing the grinding process.

Referring to FIGS. 5 and 6 in conjunction with FIGS. 3 and 4, a process of making coffee will now be described. First, place coffee beans 9 in the container 6. Hold the handle 191 to open the door 19 (FIG. 3). Next, place a filter cup 82 on a stand 81 prior to closing the door 19 (FIG. 4). Activate the electromagnetic valve 17 to move the covering member 18 away from the top of the apertures 141 of the mounting plate 14. The stop 193 pivots counterclockwise and the arm 171 thus pivots clockwise with the spring 72 being expanded. Power on the motor unit 11 for activating the reduction gear 12 and the meshed main gear 13 to transmit motion to the outer grinding mechanism 3 via the risers 163. The coffee beans 9 are then ground into powder. For adjusting the fineness of coffee powder, a user may hold and rotate the bar 76 a desired angle. It is assumed that a turning of the bar 76 in one direction will cause the seat 5 to lower due to threaded connection of the externally threaded extension 56 and the inner threads 72. The inner grinding mechanism 2 and the conic member 24 are thus lowered. And in turn, the meshed conic lower portion of the toothed section 31 lifts. As such, space confined by the inner grinding mechanism 2 and the outer grinding mechanism 3 increases. As a result, the formed coffee powder is coarse. To the contrary, a turning of the bar 76 in an opposite direction will decrease the space confined by the inner grinding mechanism 2 and the outer grinding mechanism 3, resulting in a fine coffee powder. Preferably, graduated marks are formed adjacent the indent 63 for ease of fineness adjustment. The formed coffee powder then drops through the aligned apertures 161 and 141 onto the filter cup 82. A grinding period of time can also be set in advance so that the electromagnetic valve 17 can be disabled when the set time is reached. Then the covering member 18 pivots back to cover the apertures 161 and 141 due to the compression of the spring 172 (see FIG. 6). The positioning of the stop 193 relative to the arm 171 returns to that as shown in FIG. 3 (i.e., locked). Next, hot water flows from the water inlet 182 of the hot water line 181 out of the water outlet 183 into the filter cup 82 for diluting the coffee powder. Finally, coffee drink permeates the filter cup 82 to fall into a bowl (not shown) on the base 1. Note that steam is prevented from moving up since the apertures 141 are covered by the covering member 18. This can maintain the dryness of the coffee powder.

While the invention herein disclosed has been described by means of specific embodiments, numerous modifications and variations could be made thereto by those skilled in the art without departing from the scope and spirit of the invention set forth in the claims.

What is claimed is:

1. An automatic coffee maker, comprising:
 a base comprising a motor, a reduction gear, a main gear meshed with the reduction gear, a top mounting plate including a plurality of equally spaced first apertures around a center thereof, a driven gear including a plurality of equally spaced second apertures around a central hole thereof wherein the number of the second apertures is the same as that of the first apertures, a top annular first flange around the second apertures, and two opposite risers on a top of the first flange, a threaded pin inserted through the driven gear into the mounting plate for fastening, an electromagnetic valve mounted on the base and including an arm and resilient means anchored between one end of the arm and the base, a covering member pivotably disposed at one end of the arm and including an internal hot water line, and a door including a stop on a top end of a hinged shaft thereof, the stop being in contact with the arm;

an inner grinding mechanism comprising a spindle having a first lateral through hole, an internally threaded extension on a top of the spindle, and an externally threaded conic member in a lower portion, the conic member having a bottom recess with the threaded pin disposed therein;

an outer grinding mechanism sleeved on the inner grinding mechanism and comprising a toothed section having an inverted, conic upper portion and a conic lower portion meshed with the conic member, and an upper annular second flange having two opposite flats engaged with the risers;

hollow, cylindrical means comprising an annular top third flange and an annular bottom fourth flange having a diameter smaller than that of the third flange, the hollow, cylindrical means being tightly engaged with the flats and threadedly secured to the driven gear;

a circular seat comprising an intermediate, annular fifth flange, a side opening with a joining portion of the main gear and the driven gear mounted therein, a tubelike central casing with the spindle received therein, the casing having a second lateral through hole, a second pin inserted through the second and first lateral through holes for fastening the seat and the inner grinding mechanism together, an externally threaded extension on a top of the casing, and an annular groove on an underside with the third flange snugly fitted therein, the seat being threadably secured to the mounting plate;

a funnel-shaped container for containing coffee beans and comprising a tapering member rested on the fifth flange, an upper annular surface, and an indent on a top edge of the annular surface; and a particle fineness adjusting mechanism comprising an inverted cup having inner threads secured to the externally threaded extension, a fastener driven a top of the inverted cup into the internally threaded extension for fastening the fineness adjusting mechanism and the inner grinding mechanism together, and a transverse bar extended from the inverted cup through the indent; whereby responsive to placing a filter cup in the base and closing the door, activating the electromagnetic valve will move the covering member away from the first apertures and counterclockwise pivot the stop with the resilient means being expanded so that powering on the motor will activate the reduction gear and the main gear to transmit motion to the outer grinding mechanism via the risers for grinding the coffee beans into powder which drops through the aligned second and first apertures onto the filter cup prior to falling into a bowl in the base by permeation;

deactivating the electromagnetic valve will compress the resilient means to pivot the covering member back to cover the second and first apertures, and cause hot water to flow from the hot water line into the filter cup for diluting the coffee powder;

turning the bar in one direction will lower the conic member to lift the conic lower portion of the toothed section for increasing a space confined by the inner and outer grinding mechanisms, thereby making the coffee powder more coarse; and turning the bar in an opposite direction will lift the conic member to lower the conic lower portion of the toothed section for decreasing the space, thereby making the coffee powder finer.

2. The automatic coffee maker of claim 1, wherein the resilient means is a tension spring.

3. The automatic coffee maker of claim 1, wherein the seat further comprises a plurality of equally spaced apart ribs interconnected the casing and an edge thereof.

* * * * *